US012573093B2

(12) United States Patent
Li et al.

(10) Patent No.: US 12,573,093 B2
(45) Date of Patent: Mar. 10, 2026

(54) OBJECT BLURRING ON COMPRESSED VIDEOS

(71) Applicant: GM Global Technology Operations LLC, Detroit, MI (US)

(72) Inventors: Chuan Li, Troy, MI (US); Andrew W. Averhart, Redford, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 435 days.

(21) Appl. No.: 18/170,060

(22) Filed: Feb. 16, 2023

(65) Prior Publication Data

US 2024/0282008 A1      Aug. 22, 2024

(51) Int. Cl.
　G06K 9/00　　　　(2022.01)
　G06T 5/70　　　　(2024.01)
　　　　(Continued)

(52) U.S. Cl.
　CPC ................. G06T 9/00 (2013.01); G06T 5/70 (2024.01); G06V 10/764 (2022.01); G06V 2201/07 (2022.01)

(58) Field of Classification Search
　CPC ........... G06T 9/00; G06T 5/70; G06V 10/764; G06V 2201/07; G06V 20/56; G06V 10/22; G06V 10/255; G06V 20/40; H04N 21/44008; H04N 21/440218; H04N 21/440245
　See application file for complete search history.

(56) References Cited

U.S. PATENT DOCUMENTS 11,595,619 B1　　2/2023　Gate et al.
2012/0105637 A1　5/2012　Yousefi et al.
　　　　(Continued)

OTHER PUBLICATIONS

"Cadillac CELESTIQ Establishes New Standard of Automotive Luxury," Cadillac Pressroom, Oct. 27, 2022, https://media.cadillac.com/media/us/en/cadillac/home.detail.print.html/content/Pages/news/us/en/2022/oct/1017-celestiq.html.
　　　　(Continued)

*Primary Examiner* — Gregory A Morse
*Assistant Examiner* — Owais Iqbal Memon
(74) *Attorney, Agent, or Firm* — Vivacqua Crane, PLLC

(57) ABSTRACT

A system for object blurring in compressed videos includes sensors, human machine interfaces (HMIs), and control modules. Each control module has a processor, memory, and input/output (I/O) ports. The control modules communicate with the sensors and the HMIs via the I/O ports. The memory stores control logic that is executed by the processor. The control logic receives raw image data from the sensors, encodes the raw image data into compressed image data and stores the compressed image data in memory. The control logic parses and partially decodes the compressed image data to access raw independent video frames and performs post-processing algorithms on the raw independent video frames to generate post-processed independent video frames. The post-processed independent video frames are encoded and replace raw independent video frames in the compressed image data. The control logic transmits an output including the encoded post-processed independent and dependent video frames to the HMI.

14 Claims, 4 Drawing Sheets

(51) Int. Cl.
  *G06T 9/00* (2006.01)
  *G06V 10/764* (2022.01)

(56) References Cited

U.S. PATENT DOCUMENTS

| | | | |
|---|---|---|---|
| 2013/0321629 A1 | 12/2013 | Zhang et al. | |
| 2017/0150299 A1 | 5/2017 | Coutinho et al. | |
| 2017/0347158 A1 | 11/2017 | Fu et al. | |
| 2018/0139585 A1 | 5/2018 | Gholmieh et al. | |
| 2018/0297210 A1 | 10/2018 | Peterson et al. | |
| 2018/0299900 A1 | 10/2018 | Bae et al. | |
| 2018/0324436 A1* | 11/2018 | Danielsson Fan ... | H04N 19/159 |
| 2018/0367731 A1 | 12/2018 | Gatti et al. | |
| 2018/0376067 A1 | 12/2018 | Martineau | |
| 2019/0073539 A1 | 3/2019 | Yu et al. | |
| 2019/0230323 A1 | 7/2019 | Koravadi et al. | |
| 2019/0253853 A1 | 8/2019 | Makled et al. | |
| 2019/0320328 A1 | 10/2019 | Magzimof et al. | |
| 2019/0325667 A1 | 10/2019 | Kim et al. | |
| 2019/0340844 A1 | 11/2019 | Tonshal et al. | |
| 2019/0354111 A1 | 11/2019 | Cheng et al. | |
| 2019/0355178 A1 | 11/2019 | Martinez et al. | |
| 2020/0074326 A1 | 3/2020 | Balakrishnan et al. | |
| 2020/0351322 A1 | 11/2020 | Magzimof et al. | |
| 2021/0092387 A1* | 3/2021 | Edpalm ........... | G06V 20/46 |
| 2021/0109881 A1 | 4/2021 | Moustafa et al. | |
| 2021/0256754 A1 | 8/2021 | Guo | |
| 2022/0137615 A1 | 5/2022 | Eperjesi et al. | |
| 2022/0161816 A1 | 5/2022 | Gyllenhammar et al. | |
| 2022/0368860 A1 | 11/2022 | Shinohara et al. | |
| 2022/0368972 A1 | 11/2022 | Cheraghi et al. | |
| 2022/0394283 A1 | 12/2022 | Cao | |
| 2023/0026675 A1 | 1/2023 | Wingarten | |
| 2023/0096468 A1 | 3/2023 | Ong et al. | |
| 2023/0269566 A1 | 8/2023 | Spagnolini et al. | |
| 2024/0048839 A1* | 2/2024 | Pujari ........... | G06V 40/161 |
| 2024/0338486 A1* | 10/2024 | Kalva ........... | H04N 19/70 |

OTHER PUBLICATIONS

Ahlswede, et al. "Network Information Flow," IEEE Transactions on Information Theory, vol. 46, No. 4, Jul. 2000, pp. 1204-1216.

Byers, et al. "A digital fountain approach to reliable distribution of bulk data," Conference on Applications, Technologies, Architectures, and Protocols for Computer Communication, 1998, pp. 56-67.

Chou, et al. "Practical Network Coding," Microsoft Allerton Conference on Communication, Control, and Computing, Oct. 2003, pp. 1-10.

Lopez, Jonathan. "General Motors Developing Connected Camera Platform," GM Authority Blog, Oct. 11, 2021, https://gmauthority.com/blog/2021/10/general-motors-developing-connected-camera-platform/.

U.S. Appl. No. 18/150,371, filed Jan. 5, 2023.

U.S. Appl. No. 18/158,743, filed Jan. 24, 2023.

U.S. Appl. No. 18/170,038, filed Feb. 16, 2023.

U.S. Appl. No. 18/170,033, filed Feb. 16, 2023.

* cited by examiner

OBJECT BLURRING ON COMPRESSED VIDEOS

INTRODUCTION

The present disclosure relates to videographic data, and more specifically to object blurring within compressed videos. Video encoder and decoder usage increases when supporting multiple video streams. Post processing for compressed videos requires videos to be decoded prior to image processing or computer vision algorithms can be applied. Post processed videos then need to be encoded once more before sending the re-encoded videos to local or remote storage.

In some applications, objects within videographic data may need to be obfuscated, removed, blurred, or the like for any of a variety of reasons, such as data or image privacy, regulatory requirements, or the like.

While current systems and methods for object blurring in compressed videos achieve their intended purpose, there is a need for a new and improved system and method for efficient object blurring on compressed videos that reduces computational and storage usage, reduces system structure and computational complexity, without sacrificing video quality.

SUMMARY

According to several aspects, a system for object blurring in compressed videos includes one or more sensors, one or more human machine interfaces (HMIs), and one or more control modules. Each of the one or more control modules has a processor, a memory, and one or more input/output (I/O) ports, the one or more control modules in communication with the one or more sensors via the I/O ports and in communication with the one or more HMIs via the I/O ports. The memory stores programmatic control logic. The processor executes the programmatic control logic. The programmatic control logic includes a first control logic that receives, via the I/O ports, raw input image data from the one or more sensors. A second control logic encodes the raw input image data into compressed image data and stores the compressed image data in memory. A third control logic parses and partially decodes the compressed image data to access raw independent video frames. A fourth control logic performs one or more post-processing algorithms on the raw independent video frames to generate post-processed independent video frames. A fifth control logic encodes the post-processed independent video frames, and replaces previously encoded raw independent video frames in the compressed image data with the encoded post-processed independent video frames. A sixth control logic transmits, via the I/O ports, an output to the HMI. The output includes the encoded post-processed independent video frames, and a plurality of dependent video frames.

In another aspect of the present disclosure the one or more sensors include one or more cameras, and the one or more HMIs further include: a screen visible by a human.

In yet another aspect of the present disclosure the third control logic further includes control logic that identifies independent video frames within the compressed image data, and control logic that decodes the independent video frames within the compressed video data and outputs the raw independent video frames.

In yet another aspect of the present disclosure the fourth control logic further includes one or more object detection algorithms, the one or more object detection algorithms executed on the raw independent video frames.

In yet another aspect of the present disclosure the fourth control logic further includes control logic that classifies objects detected within the raw independent video frames, and upon determining that an object within the raw independent video frames is within a protected class, executes an obfuscation control logic on the object in the protected class. Upon determining that an object in the raw independent video frames is not within a protected class, the system does not execute the obfuscation control logic with respect to the object not in a protected class.

In yet another aspect of the present disclosure the obfuscation control logic alters pixel values of the object in the protected class, thereby at least partially obfuscating the object in the protected class.

In yet another aspect of the present disclosure the fifth control logic encodes the post-processed independent video frames including obfuscated objects, and overwrites previous encoded raw independent video frames in the compressed image data with the encoded post-processed independent video frames.

In yet another aspect of the present disclosure the sixth control logic transmits an output to the HMI. The output is in a group of pictures (GOP) concept that includes the encoded post-processed independent video frames and a plurality of dependent video frames. The plurality of dependent video frames depend from the independent video frames.

In yet another aspect of the present disclosure dependent video frames include time and spatial reference information that associates each of the plurality of dependent video frames with an independent video frame, and upon decoding the dependent video frames, obfuscated objects in the independent video frames are also associated with corresponding dependent video frames.

In yet another aspect of the present disclosure a method for object blurring in compressed videos includes capturing raw input image data with one or more cameras, and utilizing one or more control modules. Each of the one or more control modules has a processor, a memory, and one or more input/output (I/O) ports. The one or more control modules are in communication with the one or more sensors via the I/O ports and in communication with the one or more HMIs via the I/O ports. The memory stores programmatic control logic, and the processor executes the programmatic control logic. The programmatic control logic includes control logic for encoding the raw input image data into compressed image data and stores the compressed image data in memory, parsing and partially decoding the compressed image data to access raw independent video frames, and performing one or more post-processing algorithms on the raw independent video frames to generate post-processed independent video frames. The control logic further includes control logic for encoding the post-processed independent video frames, and replacing previously encoded raw independent video frames in the compressed image data with the encoded post-processed independent video frames. The control logic transmits, via the I/O ports, an output to one or more human machine interfaces (HMIs). The output includes the encoded post-processed independent video frames, and a plurality of dependent video frames.

In yet another aspect of the present disclosure the control logic further includes control logic for identifying independent video frames within the compressed image data and decoding the independent video frames within the compressed video data and outputs the raw independent video frames.

In yet another aspect of the present disclosure the control logic further includes control logic for executing one or more object detection algorithms, the one or more object detection algorithms executed on the raw independent video frames.

In yet another aspect of the present disclosure the control logic further includes control logic for classifying objects detected within the raw independent video frames, and upon determining that an object within the raw independent video frames is within a protected class, executing an obfuscation control logic on the object in the protected class. Upon determining that objects in the raw independent video frames are not within a protected class, the control logic does not execute the obfuscation control logic with respect to the object not in a protected class.

In yet another aspect of the present disclosure the control logic further includes control logic for altering pixel values of the object in the protected class, thereby at least partially obfuscating the object in the protected class.

In yet another aspect of the present disclosure the control logic further includes control logic for encoding the post-processed independent video frames including obfuscated objects, and overwriting previous encoded raw independent video frames in the compressed image data with the encoded post-processed independent video frames.

In yet another aspect of the present disclosure the control logic for transmitting an output further includes transmitting a group of picture (GOP) output that includes the encoded post-processed independent video frames and a plurality of dependent video frames. The plurality of dependent video frames depend from the independent video frames.

In yet another aspect of the present disclosure upon decoding the dependent video frames, obfuscated objects in the independent video frames are also associated with corresponding dependent video frames utilizing time and spatial reference information that associates each of the plurality of dependent video frames with an independent video frame.

In yet another aspect of the present disclosure a system for object blurring in compressed videos includes one or more cameras, and one or more human machine interfaces (HMIs), each of the one or more HMIs having a screen visible by humans. The system further includes one or more control modules, each of the one or more control modules having a processor, a memory, and one or more input/output (I/O) ports, the one or more control modules in communication with the one or more sensors and in communication with the one or more HMIs via the I/O ports, the memory storing programmatic control logic. The processor executes the programmatic control logic, The programmatic control logic includes a first control logic that receives, via the I/O ports, raw input image data from the one or more sensors, and a second control logic that encodes the raw input image data into compressed image data and stores the compressed image data in memory. A third control logic parses and partially decodes the compressed image data to access raw independent video frames by identifying independent video frames within the compressed image data and decoding the independent video frames within the compressed video data. The third control logic further includes control logic to output the raw independent video frames and to execute one or more object detection algorithms on the raw independent video frames; and control logic that classifies objects detected within the raw independent video frames. Upon determining that an object within the raw independent video frames is within a protected class, an obfuscation control logic is executed on the object in the protected class. Upon determining that an object in the raw independent video frames is not within a protected class, the obfuscation control logic is not executed with respect to the object not in a protected class. A fourth control logic performs one or more post-processing algorithms on the raw independent video frames to generate post-processed independent video frames. A fifth control logic encodes the post-processed independent video frames, and replaces and overwrites previously encoded raw independent video frames in the compressed image data with the encoded post-processed independent video frames. A sixth control logic transmits, via the I/O ports, an output to the HMI. The output includes the encoded post-processed independent video frames, and a plurality of dependent video frames.

In another aspect of the present disclosure the obfuscation control logic alters pixel values of the object in the protected class, thereby at least partially obfuscating the object in the protected class.

In yet another aspect of the present disclosure the sixth control logic transmits an output to the HMI. The output is in a group of picture (GOP) concept that includes the encoded post-processed independent video frames and a plurality of dependent video frames. The plurality of dependent video frames depend from the independent video frames, and the dependent video frames include time and spatial reference information that associates each of the plurality of dependent video frames with an independent video frame. Upon decoding the dependent video frames, obfuscated objects in the independent video frames are also associated with corresponding dependent video frames.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
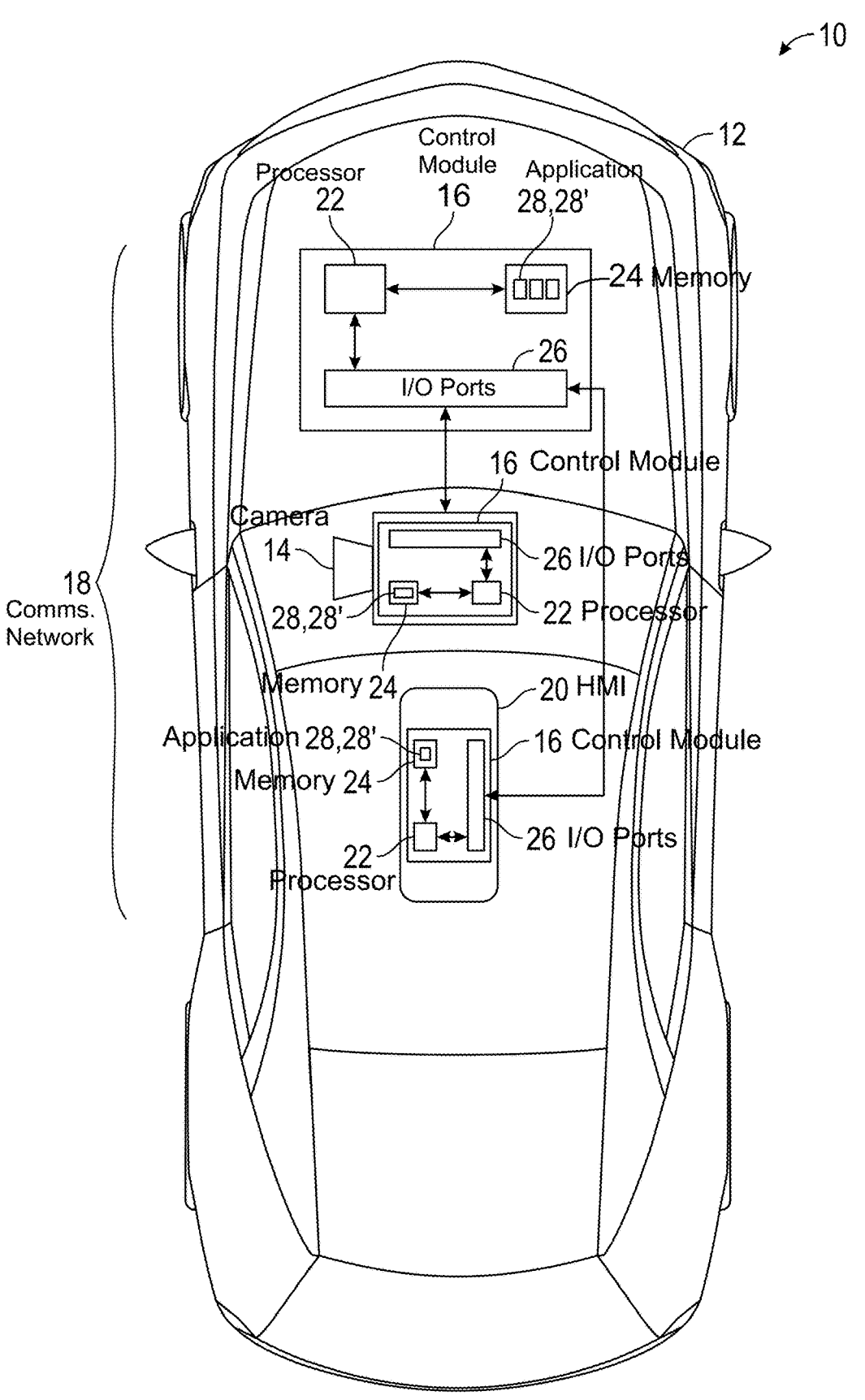
FIG. 1 is an environmental view of a system and method for efficient object blurring in compressed videos according to an exemplary embodiment.

Referring to FIG. 1, a system 10 for efficient object blurring in compressed videos is shown. The system 10 is shown with a vehicle 12. While the vehicle 12 shown in FIG. 1 is a passenger car, it should be appreciated that the vehicle 12 may be any type of vehicle 12 without departing from the scope or intent of the present disclosure. In some examples, the vehicle 12 may be a car, a truck, an SUV, a bus, a semi-tractor, a tractor used in farming or construction or the like, a watercraft, an aircraft such as a plane or helicopter, or the like. Further, it should be appreciated that while the system 10 is shown within a vehicle 12, it is contemplated that the system 10 may be outside the vehicle 12, and further, that the system 10 may operate without a vehicle 12 at all. That is, the system 10 is agnostic to particular location or application, so long as other elements of the system 10 described below are in use for video processing, and that the video processing requirements include object blurring within a video output.

The system 10 generally includes one or more sensors or cameras 14 in communication with one or more control modules 16 and a human-machine interface (HMI) 20 via a wired or wireless (Wi-Fi) communications network 18. The cameras 14 shown are intended to represent any of a variety of cameras 14 which may be linked to and communicate on the communications network 18. The cameras 14 may capture optical information in a variety of different wavelengths including those visible to humans as well as infrared, ultraviolet, and other such portions of the light spectrum that are not visible by humans. The cameras 14 may be integrated with the vehicle 12 by the vehicle 12 manufacturer, or the cameras 14 may be fitted in an after-sales service performed by the vehicle 12 or camera 14 manufacturer, by the customer, or by other third parties without departing from the scope or intent of the present disclosure. In some examples in which a vehicle 12 is not part of the system 10, the camera 14 or cameras 14 may be part of a stand-alone camera 14 system, a part of the HMI 20, or the like without departing from the scope or intent of the present disclosure. In several examples, the HMI 20 may be an onboard infotainment screen, an instrument cluster, or the like disposed within or on a vehicle 12, or the HMI 20 may be a user-provided device, including but not limited to a screen integrated with the camera 14, or a third-party device such as a smart phone 20', tablet computer, laptop computer, desktop computer, television, monitor, or any other such HMI 20 having a screen visible to humans for depicting images and/or videos.

The control modules 16 are non-generalized electronic control devices having a preprogrammed digital computer or processor 22, non-transitory computer readable medium or memory 24 used to store data such as control logic, software applications, instructions, computer code, data, lookup tables, etc., and one or more input/output (I/O) ports 26. Computer readable medium or memory 24 includes any type of medium capable of being accessed by a computer, such as read-only memory (ROM), random access memory (RAM), a hard disk drive, a compact disc (CD), a digital video disc (DVD), solid-state memory, or any other type of memory. A "non-transitory" computer readable medium or memory 24 excludes wireless, optical, or other communication links that transport electrical or other signals. A non-transitory computer readable medium or memory 24 includes media where data can be permanently stored and media where data can be stored and later overwritten, such as any type of program code, including source code, object code, and executable code. The processor 22 is configured to execute the code or instructions. In some examples, the control module 16 may be a dedicated wireless or Wi-Fi controller. The I/O ports 26 are configured to communicate through wired or wireless means using Wi-Fi protocols under IEEE 802.11x, Bluetooth communications protocols, radio frequency (RF) protocols, or the like.

In some examples, the control modules 16 include one or more applications 28. An application 28 is a software program configured to perform specific functions or sets of functions. The application 28 may include one or more computer programs, software components, sets of instructions, procedures, functions, objects, classes, instances, related data, or a portion thereof adapted for implementation in a suitable computer readable program code. The applications 28 may be stored within the memory 24 or in an additional or separate memory 24. Examples of the applications 28 include audio or video streaming services, audio or visual processing services, and the like.

Figure 2:
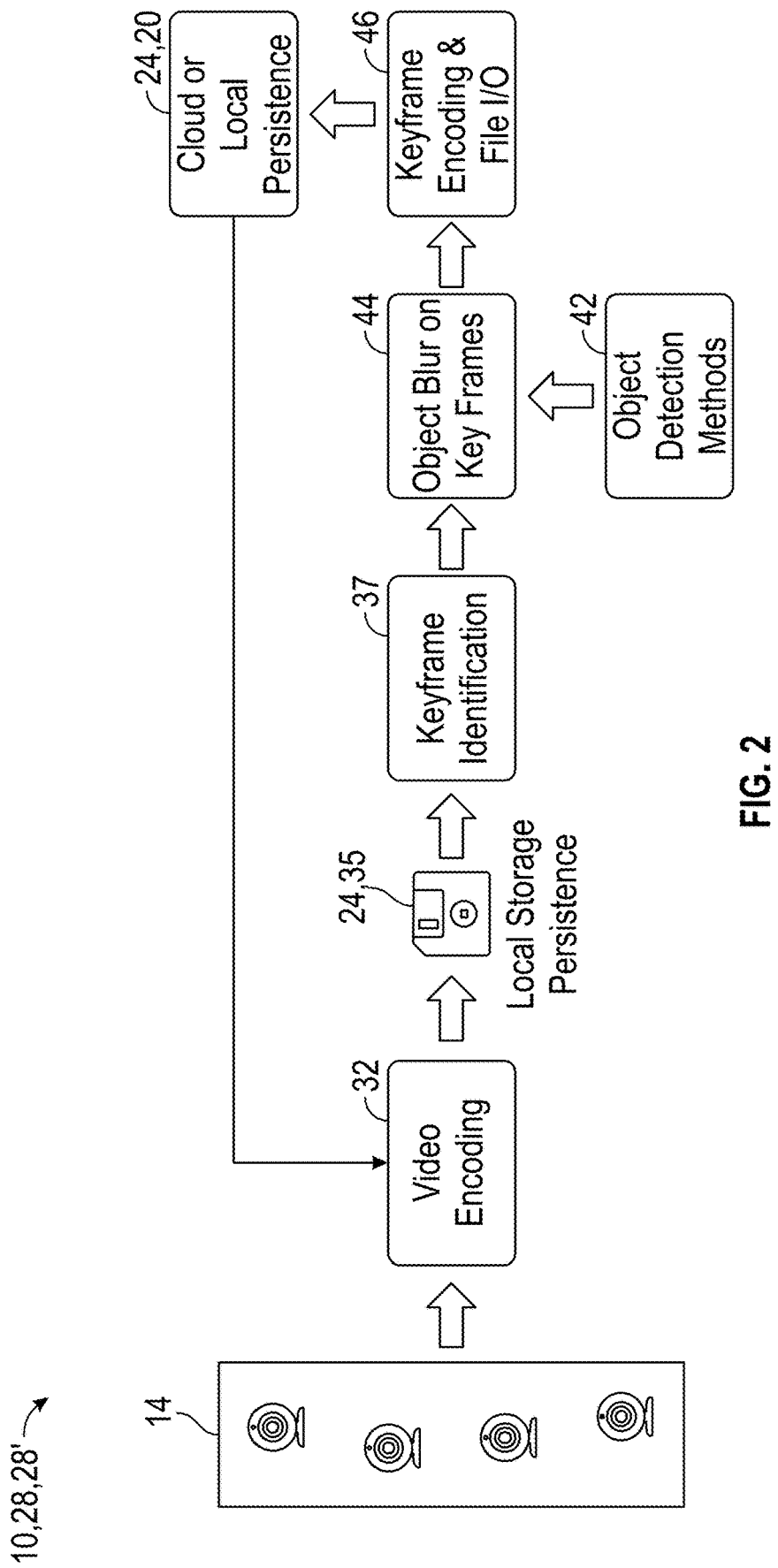
FIG. 2 is a block diagram depicting logical operational flow of the system and method for efficient object blurring in compressed videos of FIG. 1 according to an exemplary embodiment.
Figure 3:
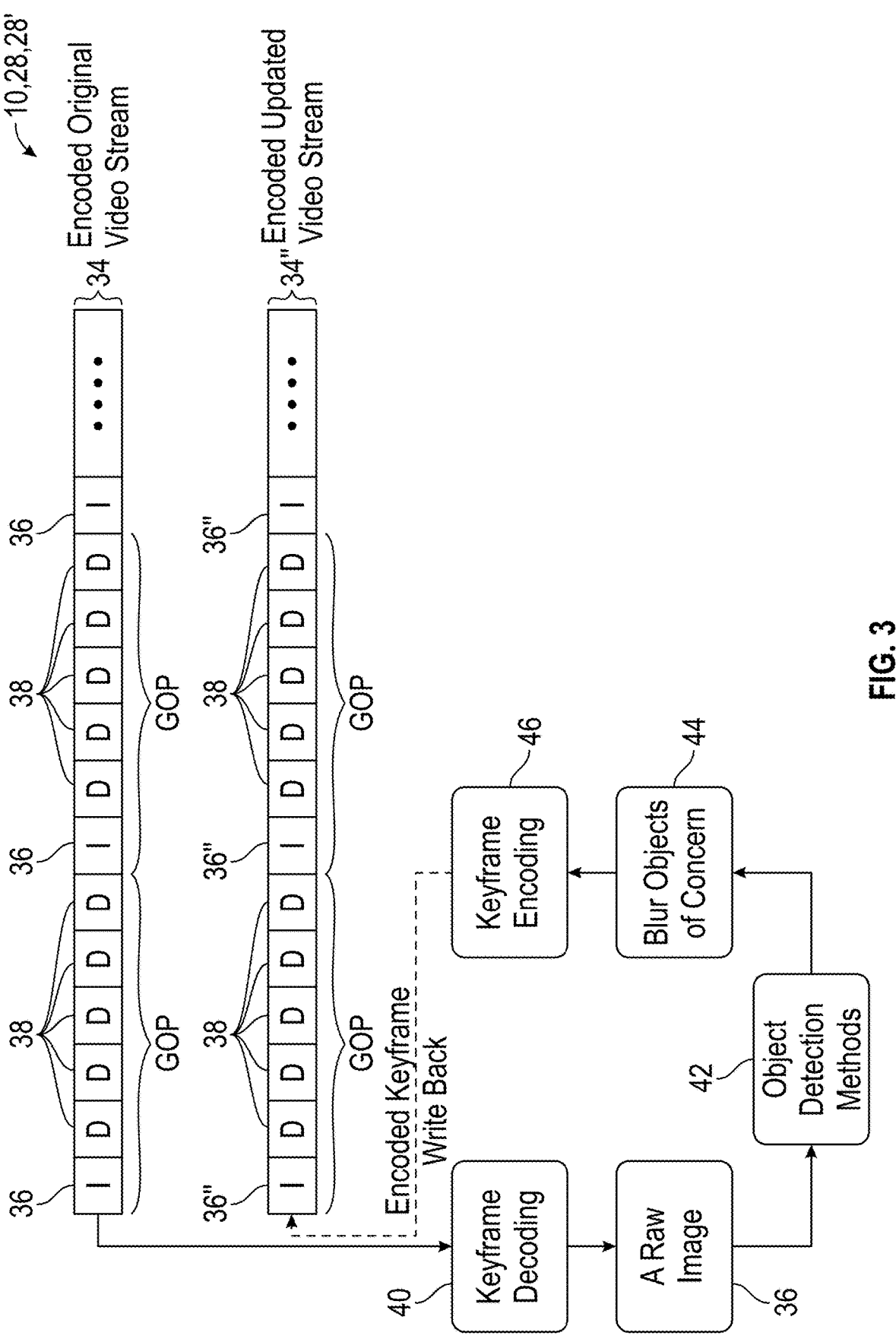
FIG. 3 is a flow diagram depicting a writeback operation for processing independent video frames in the system and method for efficient object blurring in compressed videos of FIG. 1 according to an exemplary embodiment.

Turning now to FIGS. 2 and 3 and with continuing reference to FIG. 1, an application 28' for efficient object blurring in compressed videos is shown. The blurring application 28' is stored in memory 24, and includes several programmatic control logic functions that are executed by the processor 22. The blurring application 28' causes the cameras 14 to capture raw input image data 30. The raw input image data 30 may include a variety of different image types, including but not limited to one or more video frames, a plurality of still image frames produced through motion capture technologies, or the like. The cameras 14 may include a control module 16 that at least temporarily stores the raw input image data 30, or the cameras 14 may transmit the raw input image data 30 to a separate control module 16 where the raw input image data 30 is stored.

In several aspects, the control module 16, whether onboard the camera 14 or remote from the camera 14, executes another control logic of the blurring application 28' that encodes 32 the raw input image data 30 into compressed image data 34, and stores 35 the compressed image data 34 in memory 24. The control logic that encodes 32 the raw input image data 30 may operate with any of a variety of encoding protocols including but in no way limited to Motion Picture Expert Groupe (MPEG), QuickTime Movie (MOV), Audio Video Interleave (AVI), Flash Video Format (FLV), Matroska Video Container (MKV), Google WebM, or any of a variety of others without departing from the scope or intent of the present disclosure.

By compressing the raw input image data 30, the system 10 reduces a quantity of memory 24 required for storing data captured by the cameras 14 from a first amount to a second amount less than the first amount. The control module 16 subsequently executes another control logic of the blurring application 28' that parses 37 the compressed image data 34 into or otherwise identifies independent video frames 36 and dependent video frames 38. In several aspects, the independent video frames 36 define keyframes. The keyframes or independent video frames 36 define starting and/or end points of portions of videographic data captured by the cameras 14. In several aspects, the portions of videographic data captured by cameras 14 define a group of pictures (GOP) concept spanning a plurality of video frames and including at least one independent video frame 36 and a plurality of dependent video frames 38 which rely on the independent video frame 36 within that GOP. That is, in videographic data captured by the cameras 14, the videographic data is broken down into a plurality of individual video frames. Each of the keyframes or independent video frames 36 sets parameters for dependent video frames 38 and indicate any changes that will occur throughout the videographic data as transitions. More specifically, each of the dependent video frames 38 includes time and spatial reference information that associates each of the plurality of dependent video frames 38 with an independent video frame 36.

Once compressed image data 34 has been parsed, the control module 16 executes a control logic of the blurring application 28' that partially decodes 40 the compressed image data 34. Specifically, the processor 22 executes control logic that extracts and decodes 40 the independent video frames 36 into raw independent video frame 36 format, while leaving dependent video frames 38 in compressed format.

The processor 22 then executes a control logic of the blurring application 28' that takes the extracted raw independent video frames 36 as an input to one or more post-processing object detection algorithms 42. The object detection algorithms may include proprietary algorithms, Histogram of Oriented Gradients (HOG) algorithms, Region-based Convolutional Neural Networks (R-CNN) algorithms, Faster R-CNN algorithms, Single Shot Detector (SSD) algorithms, You Only Look Once (YOLO) algorithms, or the like. The object detection algorithms 42 may operate using proprietary object detection libraries and/or predefined object detection libraries such as ImageAI, GluonCV, Detectron2, YOLOv3_TensorFlow, DarkFlow, or the like without departing from the scope or intent of the present disclosure.

The one or more object detection algorithms 42 classify objects detected within each of the raw independent video frames 36. More specifically, the objects detected are classified according to predefined parameters in the one or more object detection libraries. In several aspects, at least some of the parameters include correlations between specific object types and protected or unprotected designations. In several examples, images taken in public may be modified to obscure or otherwise oblate personally-identifiable information. More specifically still, in some jurisdictions, public policy, law, or individual interests may require that certain identifiable information be classified as protected, such as: human faces, license numbers or letters, vehicles, signage, homes and home addresses, pets, and other personally-identifiable or locationally identifiable information be removed or obfuscated within image data. Accordingly, the one or more object detection algorithms 42 distinguish between objects in the raw independent video frames 36 and assign protected class designations to detected objects that will be obscured or otherwise obfuscated.

That is, upon determining that an object within the raw independent video frames 36 is within a protected class, the control module 16 executes a portion of the blurring application 28' defining an obfuscation control logic 44 on the object in the protected class. In several aspects, the obfuscation control logic 44 alters pixel values of the object in the protected class, thereby at least partially obfuscating the object. In several aspects, all pixels defining portions of the objects in the protected class may be modified to have the same pixel values as one another, randomized pixel values, or the like, so long as original pixel values are sufficiently altered to obscure the object in a post-processed independent video frame 36". However, when objects detected in raw independent video frames 36 are not classified as within a protected class, the blurring application 28' is not executed on the non-protected class object.

Once object detection and obfuscation control logics 42, 44 have been carried out on each raw independent video frame 36 to produce post-processed independent video frames 36", the control module 16 executes a control logic of the blurring application 28' that encodes 46 the post-processed independent video frames 36", including the blurred objects, using protocols such as those described hereinabove. The now encoded and post-processed independent video frames 36" are then inserted into the compressed image data 34 to form an updated compressed image data stream 34". More specifically the post-processed independent video frames 36" replace and overwrite corresponding unmodified independent video frames 36.

Once the compressed image data 34 has been augmented through the replacement of unmodified independent video frames 36 with post-processed independent video frames 36", the updated compressed data stream 34" is stored in memory 24 which may be local, i.e. onboard the camera 14, the vehicle 12, the HMI 20, or the like, or in a remote cloud storage memory 24. The control module 16 then executes a control logic that transmits the updated compressed image data stream 34" to the screen of the HMI 20. In several aspects, the updated compressed image data stream similarly defines a GOP including the encoded post processed independent video frames 36" and the plurality of unmodified dependent video frames 38. Thus, upon decoding the dependent video frames 38, obfuscated objects in the post-processed independent video frames 36 are also associated with corresponding dependent video frames 38. The system 10 and control logics operating therein as described herein operate continuously and/or recursively while the cameras 14 are being used to capture input image data 30, thereby continuously obfuscating protected objects in the input image data 30.

Figures 4A, 4B:
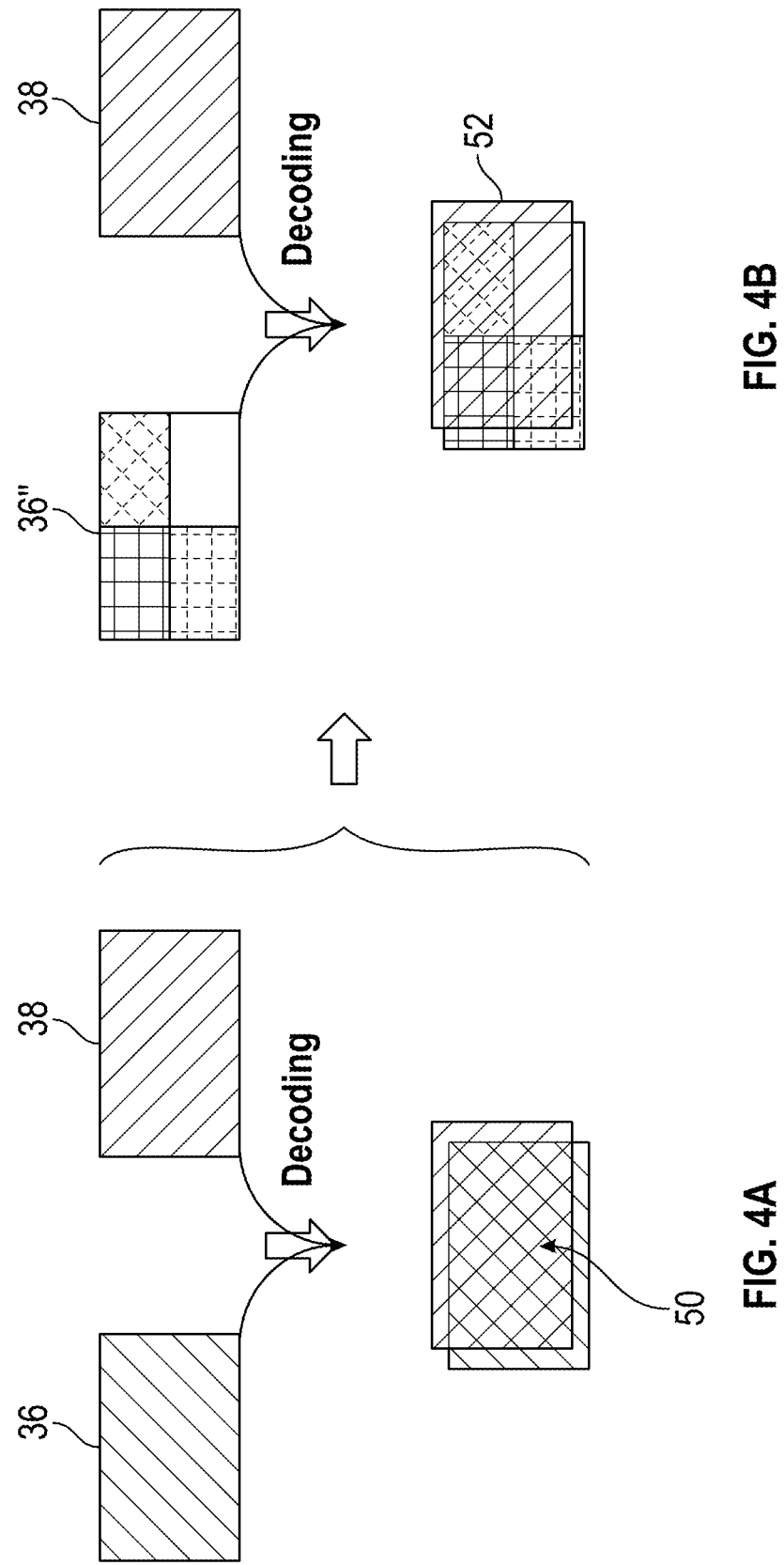
FIG. 4A is a block diagram depicting the combination of independent and dependent video frames to recover ground truth information without blurring information in the independent video frames according to an exemplary embodiment.
FIG. 4B is a block diagram depicting the combination of blurred independent and unblurred dependent video frames resulting in an image in which ground truth is obscured according to the system and method for efficient object blurring in compressed videos of FIG. 1 according to an exemplary embodiment.

Turning now to FIGS. 4A and 4B and with continuing reference to FIGS. 1-3, illustrations of ground truth data 50 are shown in relation to the data contained in independent video frames 36 and dependent video frames 38. In FIG. 4A, an unmodified independent video frame 36 and dependent video frame 38 are shown being decoded and combined to create one or more images depicting the ground truth data 50 at various points in time. By contrast, in FIG. 4B, a manipulated or post-processed independent video frame 36" is combined with a dependent video frame 38. As is symbolically represented by the checkerboard pattern in the post-processed independent video frame 36", the post-processing has obscured object data within the post processed independent video frame 36" by changing pixel values in relation to the original independent video frame 36 shown in FIG. 4A. Because the dependent video frames 38 rely upon preceding independent video frames 36 for much of their content, and because the post-processed independent video frames 36" include blurred or otherwise obfuscated objects, the dependent video frames 38 depending therefrom are effectively modified to include the blurred or otherwise obfuscated objects as well. Therefore, when post-processed independent video frames 36" are used as described herein, it is impossible to recover accurate ground truth information 50, and an at least partially obfuscated image 52 results.

Further, because the system 10 and control logics of the blurring application 28' described herein are used to directly decode, modify, re-encode, and transmit the independent video frames 36 without applying similar processing to associated dependent video frames 38, various efficiencies may be recognized. In several aspects, because only the independent video frames 36, which form a small proportion of the full raw input image data 30, are so processed, computational resource consumption and communications network resource consumption are reduced, and processing and communications speeds can thereby be increased without sacrificing image quality, quality of service (QoS), or the like. Likewise, because a properly encoded video file contains correct dependencies for dependent video frames 38 to be correctly decoded, scenes in dependent video frames 38 represent the actual visible scene when cameras 14 capture the dependent video frames 38. By manipulating the independent video frames 36, upon which the dependent video frames 38 rely, actual or correct pixel values for pixels corresponding to protected objects are altered. Decoders working on video data that has been altered by modifying only the independent video frames 36 cannot reconstruct what actual protected objects look like. Therefore, it becomes impossible for decoders to reconstruct protected objects in dependent frames 38 as well.

A system and method for efficient blurring of objects in compressed videos of the present disclosure offers several advantages. These include the ability to reduce encoder and decoder congestion by reducing computational processing and communications bandwidth usage, reducing computational complexity, and maintain or improve video quality while maintaining or improving quality of service (QoS), while meeting or exceeding privacy and/or regulatory requirements in a portable and modular manner.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for object blurring in compressed videos, the system comprising:

one or more sensors;

one or more human machine interfaces (HMIs);

one or more control modules, each of the one or more control modules having a processor, a memory, and one or more input/output (I/O) ports, the one or more control modules in communication with the one or more sensors and in communication with the one or more HMIs via the I/O ports, the memory storing programmatic control logic, the processor executing the programmatic control logic, the programmatic control logic comprising:

a first control logic that receives, via the I/O ports, raw input image data from the one or more sensors;

a second control logic that encodes the raw input image data into compressed image data and stores the compressed image data in memory;

a third control logic that parses and partially decodes the compressed image data to access raw independent video frames, including:

control logic that identifies independent video frames within the compressed image data;

control logic that decodes the independent video frames within the compressed video data and outputs the raw independent video frames;

control logic for one or more object detection algorithms, the one or more object detection algorithms executed on the raw independent video frames;

control logic that classifies objects detected within the raw independent video frames; and upon determining that an object within the raw independent video frames is within a protected class, executes an obfuscation control logic on the object in the protected class; and upon determining that an object in the raw independent video frames is not within a protected class, does not execute the obfuscation control logic with respect to the object not in a protected class;

a fourth control logic that performs one or more post-processing algorithms on the raw independent video frames to generate post-processed independent video frames;

a fifth control logic that encodes the post-processed independent video frames, and replaces previously encoded raw independent video frames in the compressed image data with the encoded post-processed independent video frames; and a sixth control logic that transmits, via the I/O ports, an output to the HMI, wherein the output includes the encoded post-processed independent video frames, and a plurality of dependent video frames, wherein the plurality of dependent video frames depend from the encoded post-processed independent video frames.

2. The system of claim 1, wherein the one or more sensors comprise:

one or more cameras; and wherein the one or more HMIs further comprise: a screen visible by a human.

3. The system of claim 1, wherein the obfuscation control logic alters pixel values of the object in the protected class, thereby at least partially obfuscating the object in the protected class.

4. The system of claim 1, wherein the fifth control logic encodes the post-processed independent video frames including obfuscated objects; and overwrites previous encoded raw independent video frames in the compressed image data with the encoded post-processed independent video frames.

5. The system of claim 4, wherein the sixth control logic that transmits an output to the HMI, wherein the output is in a group of pictures (GOP) concept that includes the encoded post-processed independent video frames and the plurality of dependent video frames.

6. The system of claim 5, wherein dependent video frames include time and spatial reference information that associates each of the plurality of dependent video frames with an independent video frame, and wherein upon decoding the dependent video frames, obfuscated objects in the independent video frames are also associated with corresponding dependent video frames.

7. A method for object blurring in compressed videos, the method comprising:

capturing raw input image data with one or more cameras;

utilizing one or more control modules, each of the one or more control modules having a processor, a memory, and one or more input/output (I/O) ports, the one or more control modules in communication with the one or more cameras and in communication with one or more human-machine interfaces (HMIs) via the I/O ports, the memory storing programmatic control logic, the processor executing the programmatic control logic for:

encoding the raw input image data into compressed image data and stores the compressed image data in memory;

parsing and partially decoding the compressed image data to access raw independent video frames, including:

identifying independent video frames within the compressed image data;

decoding the independent video frames within the compressed video data and outputs the raw independent video frames;

executing one or more object detection algorithms, the one or more object detection algorithms executed on the raw independent video frames;

classifying objects detected within the raw independent video frames;

upon determining that an object within the raw independent video frames is within a protected class, executing an obfuscation control logic on the object in the protected class; and upon determining that objects in the raw independent video frames are not within a protected class, not executing the obfuscation control logic with respect to the object not in a protected class;

performing one or more post-processing algorithms on the raw independent video frames to generate post-processed independent video frames;

encoding the post-processed independent video frames, and replaces previously encoded raw independent video frames in the compressed image data with the encoded post-processed independent video frames; and transmitting, via the I/O ports, an output to the one or more HMIs, wherein the output includes the encoded post-processed independent video frames, and a plurality of dependent video frames, wherein the plurality of dependent video frames depend from the encoded post-processed independent video frames.

8. The method of claim 7, further comprising:

altering pixel values of the object in the protected class, thereby at least partially obfuscating the object in the protected class.

9. The method of claim 7, further comprising:

encoding the post-processed independent video frames including obfuscated objects; and overwriting previous encoded raw independent video frames in the compressed image data with the encoded post-processed independent video frames.

10. The method of claim 9, wherein transmitting an output further comprises:

transmitting a group of picture (GOP) output that includes the encoded post-processed independent video frames and a plurality of dependent video frames.

11. The method of claim 9, wherein upon decoding the dependent video frames, obfuscated objects in the independent video frames are also associated with corresponding dependent video frames utilizing time and spatial reference information that associates each of the plurality of dependent video frames with an independent video frame.

12. A system for object blurring in compressed videos, the system comprising:

one or more cameras;

one or more human machine interfaces (HMIs), each of the one or more HMIs having a screen visible by humans;

one or more control modules, each of the one or more control modules having a processor, a memory, and one or more input/output (I/O) ports, the one or more control modules in communication with the one or more cameras and in communication with the one or more HMIs via the I/O ports, the memory storing programmatic control logic, the processor executing the programmatic control logic, the programmatic control logic comprising:

a first control logic that receives, via the I/O ports, raw input image data from the one or more sensors;

a second control logic that encodes the raw input image data into compressed image data and stores the compressed image data in memory;

a third control logic that parses and partially decodes the compressed image data to access raw independent video frames by identifying independent video frames within the compressed image data and decoding the independent video frames within the compressed video data, wherein the third control logic further includes control logic to output the raw independent video frames and to execute one or more object detection algorithms on the raw independent video frames; and control logic that classifies objects detected within the raw independent video frames; and upon determining that an object within the raw independent video frames is within a protected class, executes an obfuscation control logic on the object in the protected class; and upon determining that an object in the raw independent video frames is not within a protected class, does not execute the obfuscation control logic with respect to the object not in a protected class;

a fourth control logic that performs one or more post-processing algorithms on the raw independent video frames to generate post-processed independent video frames;

a fifth control logic that encodes the post-processed independent video frames, and replaces and overwrites previously encoded raw independent video frames in the compressed image data with the encoded post-processed independent video frames; and a sixth control logic that transmits, via the I/O ports, an output to the HMI, wherein the output includes the encoded post-processed independent video frames, and a plurality of dependent video frames, wherein the plurality of dependent video frames depend from the encoded post-processed independent video frames.

13. The system of claim 12, wherein the obfuscation control logic alters pixel values of the object in the protected class, thereby at least partially obfuscating the object in the protected class.

14. The system of claim 12, wherein the sixth control logic that transmits an output to the HMI, wherein the output is in a group of picture (GOP) concept that includes the encoded post-processed independent video frames and a plurality of dependent video frames, wherein the dependent video frames include time and spatial reference information that associates each of the plurality of dependent video frames with an independent video frame, and wherein upon decoding the dependent video frames, obfuscated objects in the independent video frames are also associated with corresponding dependent video frames.

* * * * *